US 7,395,063 B2

(12) United States Patent
Stille et al.

(10) Patent No.: US 7,395,063 B2
(45) Date of Patent: Jul. 1, 2008

(54) METHOD AND DEVICE FOR A SHARED RADIO NETWORK

(75) Inventors: Mats Stille, Stockholm (SE); Niklas Lundin, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1153 days.

(21) Appl. No.: 10/092,535

(22) Filed: Mar. 8, 2002

(65) Prior Publication Data

US 2002/0128028 A1 Sep. 12, 2002

Related U.S. Application Data

(60) Provisional application No. 60/274,213, filed on Mar. 9, 2001.

(51) Int. Cl.
*H04Q 7/20* (2006.01)

(52) U.S. Cl. .............. 455/432.1; 455/432.2; 455/432.3; 455/418; 455/433; 455/435.1; 455/436; 455/513; 370/338

(58) Field of Classification Search ................. 455/513, 455/509, 517, 518, 519, 520, 521, 500, 488, 455/432.1, 432.3, 448, 433, 432.2, 435.1, 455/436, 411, 418, 434, 419; 379/130, 132; 370/338

See application file for complete search history.

(56) References Cited

U.S. PATENT DOCUMENTS

| 5,361,297 | A | * | 11/1994 | Ortiz et al. ................... 379/130 |
| 5,504,935 | A | * | 4/1996 | Vercauteren ................. 455/438 |
| 5,894,596 | A | * | 4/1999 | Hayes, Jr. .................... 455/418 |
| 6,243,572 | B1 | * | 6/2001 | Chow et al. .................. 455/408 |
| 6,374,107 | B1 | * | 4/2002 | Boylan et al. ............. 455/432.3 |
| 6,377,804 | B1 | * | 4/2002 | Lintulampi ............... 455/435.2 |
| 6,684,072 | B1 | * | 1/2004 | Anvekar et al. ........... 455/432.1 |
| 6,708,031 | B2 | * | 3/2004 | Purnadi et al. .............. 455/436 |
| 6,714,788 | B2 | * | 3/2004 | Voyer .......................... 455/453 |
| 6,741,848 | B2 | * | 5/2004 | Timonen et al. ............. 455/405 |
| 2001/0046856 | A1 | * | 11/2001 | McCann ...................... 455/423 |
| 2003/0013443 | A1 | * | 1/2003 | Willars et al. ............... 455/432 |

\* cited by examiner

*Primary Examiner*—Matthew Anderson
*Assistant Examiner*—Shaima Q. Aminzay
(74) *Attorney, Agent, or Firm*—Nixon & Vanderhye P.C.

(57) ABSTRACT

Method and device, respectively, for determining which one of the owners of a shared radio network that a visiting mobile terminal (MT), which MT is not subscribed to any of the owners of said shared radio network, is going to be connected to, by deriving information from the visiting MT concerning its identity. The method and device, respectively, is characterized in that said information is used in said shared radio network for determining which one of said owners said visiting MT is going to be connected to.

20 Claims, 2 Drawing Sheets

METHOD AND DEVICE FOR A SHARED RADIO NETWORK

This application claims the benefit of provisional application Ser. No. 60/274,213, filed on Mar. 9, 2001, which is incorporated by reference in this application.

TECHNICAL FIELD

The invention relates to a method and device, respectively, for determining which one of the owners of a shared radio network that a visiting MT (Mobile Terminal), which MT is not subscribed to any of the owners of said shared radio network, is going to be connected to, by deriving information from the visiting MT concerning its identity.

BACKGROUND

Due to the development of equipment for wireless transport of data, for example e-mail, many network operators are establishing such services for their customers. Future fields of use may be to acquire video sequences from an on-going sports event, for example a game of football. When a goal is scored one may watch the event on, by way of example, a cell phone monitor.

Previously, so-called circuit coupling has been used for transmission of data. Data is then sent via a line, and the operator charges the user for the time the line is open. Then data is only sent sporadically, and the user pays for the capacity that is reserved for him.

When using GPRS (Global Packet Radio Service), data is sent in packages and the operator then has the possibility to charge the user for the amount of data that is sent. Using this service, the line is either shared with other users, or only open when the packages are transmitted.

Previous GPRS systems are called 2.5 G (second and a half generation) and use GSM (Global System for Mobile communication) as a radio system. Now the operators are going to introduce 3 G (third generation) where GPRS uses UMTS (Universal Mobile Telecommunications System) as a radio system. UMTS is faster then the older GSM, and has the support of many major telecommunications operators and manufacturers because it represents a unique opportunity to create a mass market for highly personalised and user-friendly mobile access to tomorrow's information society. UMTS will deliver pictures, graphics, video communications and other wideband information as well as voice and data, directly to people who can be on the move. UMTS builds on the capability of today's mobile technologies (like digital cellular and cordless) by providing increased capacity, data capability and a far greater range of services using an innovative radio access scheme and an enhanced, evolving core network.

However, the introduction of UMTS is expensive for the operators as licenses have become very expensive for many 3 G operators. The equipment is also quite expensive. One way to decrease the cost of the UMTS introduction is for two or more 3 G operators to establish a shared 3 G radio network. Some network elements are located in the home network of a respective operator. Example of network elements in the home network are GGSN (Gateway GPRS Support Node) and HLR (Home Location Register). The GGSN is a gateway node that terminates specific protocols, and the HLR is a large data base containing information about all subscribers. The shared network must be able to pass outgoing packet sessions via the correct home network.

A network may be shared by two or more operators. For illustrative reasons we suppose that the shared network is shared by two operators and call them operator A and B. If two mobile terminals, MT1 and MT2, which are subscribed to operator A and operator B, respectively, are going to pass outgoing data packet sessions via the shared network, an SGSN (Switching GPRS Support Node), a kind of switch, in said shared network is able to pass said outgoing packet sessions via the correct home network of the operators A and B.

If a visiting mobile terminal MT3, which is subscribed to an operator X, is going to pass outgoing data packet sessions via the shared network belonging to operators A and B the shared network is able to determine that MT3 is a visiting mobile terminal, and that it may use the shared network (operator X has an agreement with either operator A or operator B, or both). The shared network is, however, not able to determine via which home network of the operators A and B the data packages are to be passed. The result is that it is not possible to predict towards which GGSN the visiting MT3 will establish a so-called PDP context (Packet Data Protocol), i.e. a connection for GPRS.

If two mobile terminals MT3 and MT4 are subscribed to operators X and Y, respectively, and are going to pass data packages via a shared network belonging to operators A and B, the SGSN in said shared network may only state that MT3 and MT4 are visiting mobile terminals, and if they are allowed to use the shared network, nothing else.

It would be of interest to route the visiting mobile terminals in a shared network, subscribed to different operators, that not are the ones that own the shared network, to predetermined home networks of the operators that own the shared network depending on which operators the visiting mobile terminals are subscribed to. There is no way for the current available technology to admit the shared network to identify to which operator a visiting mobile terminal is subscribed.

SUMMARY

An object of the invention is to determine which one of the owners of a shared radio network that a visiting MT (Mobile Terminal), which MT is not subscribed to any of the owners of said shared radio network, is going to be connected to, by deriving information from the visiting MT concerning its identity.

The object is solved by using said information in said shared radio network for determining which one of said shared radio network owners said visiting MT is going to be connected to.

In a preferred example embodiment the shared radio network uses GPRS (Global Packet Radio Service).

In another preferred example embodiment regarding the radio system used, the shared radio network may use any of the radio systems UMTS (Universal Mobile Telecommunications System), GSM (Global System for Mobile communication), CDMA (Code Division Multiple Access) or TDMA (Time Division Multiple Access).

In yet another preferred example embodiment, the IMSI (International Mobile Subscriber Identity) of the visiting MT is used for deriving information concerning the identity of said MT and a list in the SGSN (Switching GPRS Support Node) of said shared radio network for comparison with information concerning the identity of the visiting MT.

BRIEF DESCRIPTION OF DRAWINGS

The invention will be described below in connection with an example of a preferred embodiment and the enclosed drawings, where.

MODE FOR CARRYING OUT THE INVENTION

Figure 1:
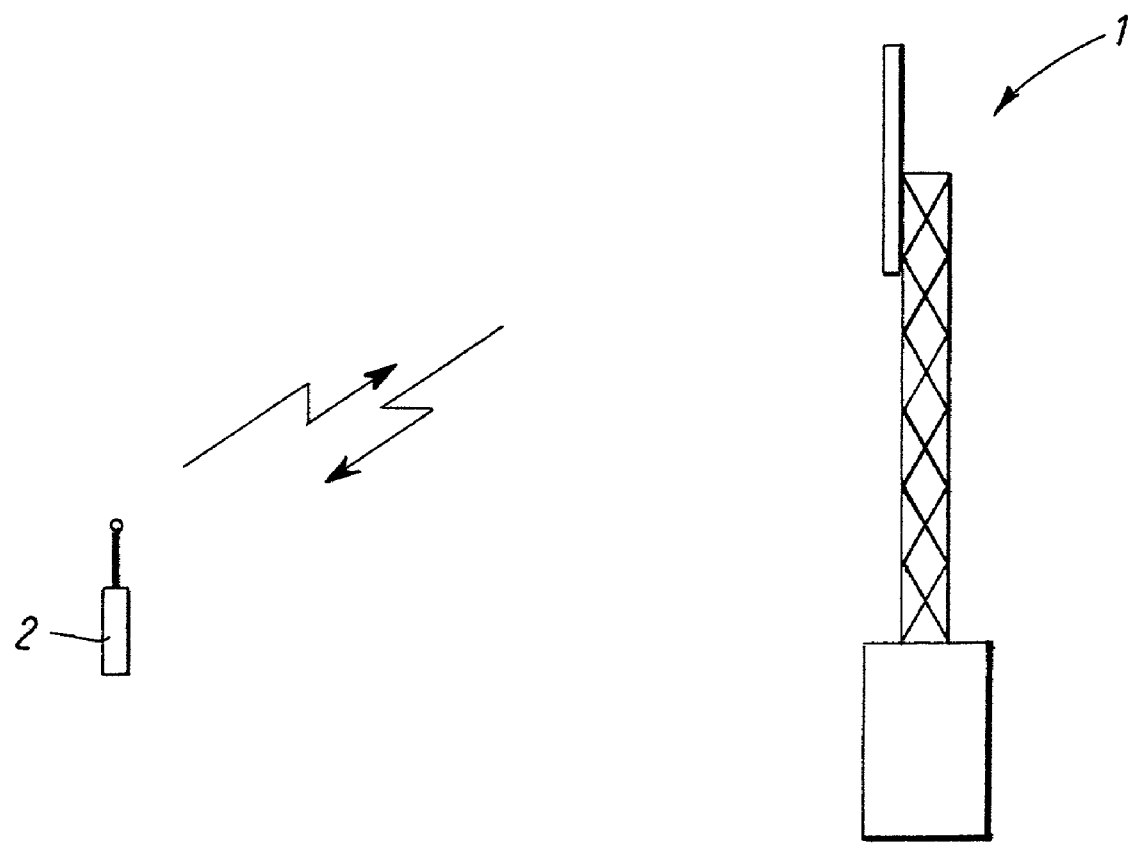
FIG. 1 is a schematic view of a mobile terminal contacting a base station.

This invention constitutes an improvement in the field of wireless data networks, in particular wireless package data networks. Due to the development of equipment for wireless transport of data, for example e-mail, many network operators are establishing such services for their customers. Future fields of use may be to acquire video sequences from an on-going sports event, for example a game of football, when a goal is scored, and watch the event on a wireless monitor. With reference to FIG. 1, a mobile base station, here referred to as Node-B 1 is contacted by an MT (mobile terminal) 2. When using GPRS (Global Packet Radio Service) data is sent in packages, and the operator then has the possibility to charge the user for the amount of data that is sent. Using this service, the line is either shared with other users, or only open when the packages are transmitted.

The introduction of 3G (third generation) wireless networks means that the service GPRS uses UMTS (Universal Mobile Telecommunications System) as radio system. UMTS is faster then the older GSM, but the introduction of UMTS is expensive for the operators as licenses have become very expensive for many 3G operators. The equipment is also quite expensive. One way to decrease the cost of the UMTS introduction is, by way of example, for two or more 3G operators to establish a shared 3G radio network. Some network elements are located in the home network of respective operator. Example of network elements in the home network is GGSN (Gateway GPRS Support Node) and HLR (Home Location Register). The GGSN is a gateway node that terminates specific protocols, and the HLR is a large data base containing information about all subscribers. The shared network must be able to pass outgoing packet sessions via the correct home network.

Figure 2:
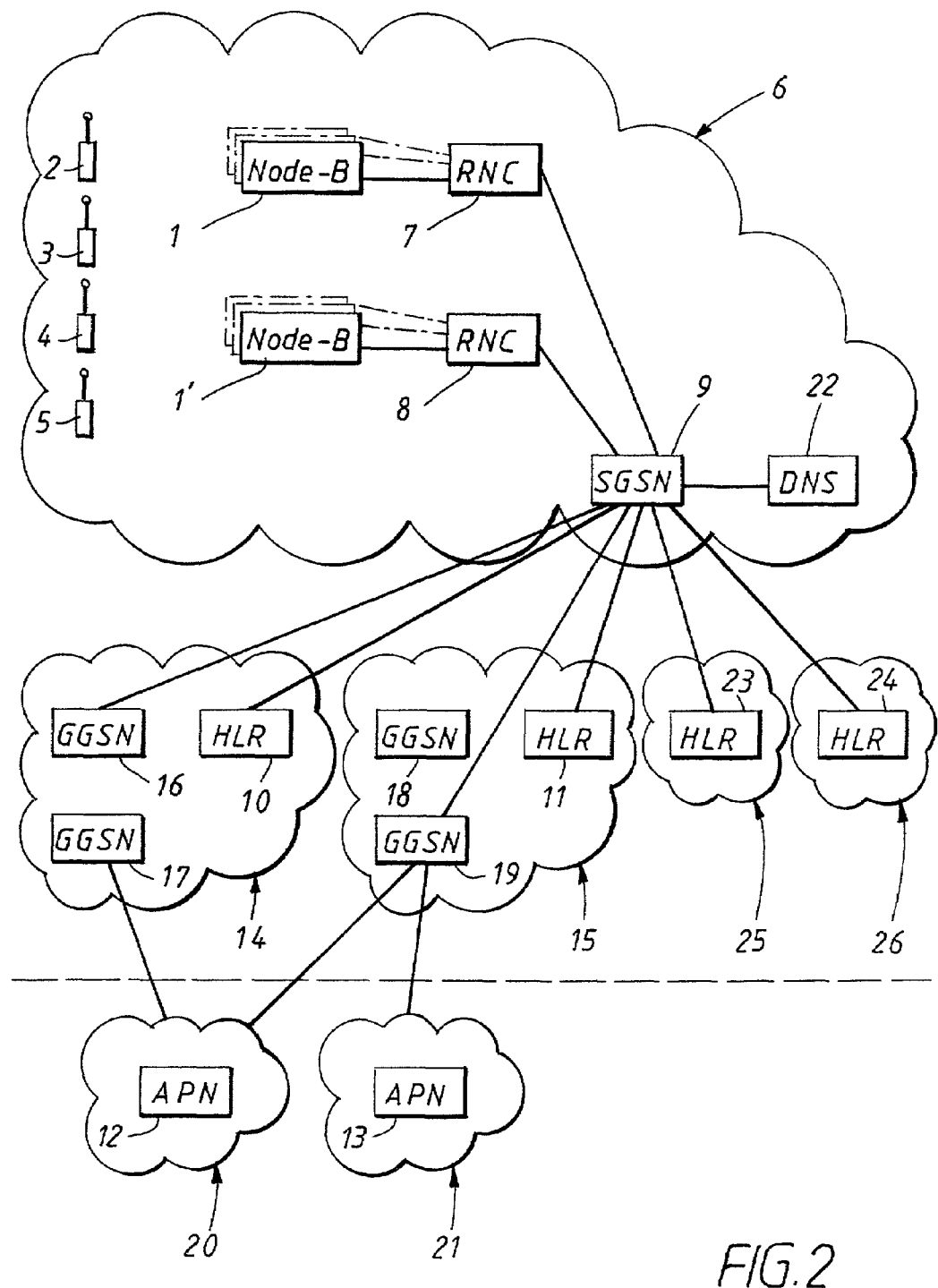
FIG. 2 is a schematic overview of a system in which the invention can be applied.

With reference now to FIG. 2, four MT:s 2, 3, 4, 5 are located in a shared radio network 6. An MT 2 contacts the shared radio network 6 which is owned by operators of which one operator is the one that the MT 2 is subscribed to. There one Node-B 1 is contacted, said Node-B 1 is connected to an RNC (Radio Network controller) 7. Note that it is schematically shown in FIG. 2, but without reference signs, that more than one Node-B may be connected to the RNC 7. There may also be more than one RNC 7, 8 in a shared radio network 6, as shown in FIG. 2, where one or more Node-B 1 are connected to an RNC 7 and one or more Node-B 1' are connected to another RNC 8. There can be more than two RNC:s 7, 8 in a shared radio network 6, but FIG. 2 only shows two RNC:s 7, 8. The RNC:s 7, 8 in a shared radio network 6 are connected to an SGSN (Switching GPRS Support Node) 9 which works as a kind of switch. The SGSN 9 retrieves an IMSI (International Mobile Subscriber Identity) from MT 2. The IMSI is incorporated in the MT 2, by way of example in the SIM card.

Then the SGSN 9 contacts a HLR (Home Location Register) 10, 11, which is a large database containing information about the subscribers and which APN (Access Point Name) 12, 13 that a specific subscriber may use, which information is provided to the SGSN 9 using the IMSI. The APN 12, 13 consists of two parts; an NI (network identity) and an OI (Operator Identity). The HLR 10, 11 used is the one that belongs to a home network 14, 15 of the MT 2. Note that the elements shown in the home network 14, 15 are those that are necessary for the understanding of the invention, and a number of other, not shown, elements may be a part of the home network 14, 15.

The APN 12, 13 may be provided by the MT 2 or the SGSN 9 to select a GGSN (Gateway GPRS Support Node) 16, 17, 18, 19, different GGSN:s are linked to different IP networks 20, 21. When the SGSN 9 has acquired a complete APN 12, 13, as will be described below, a DNS (Domain Name System) 22 is contacted. The DNS 22 delivers the GGSN IP addresses that correspond to a certain APN, i.e. provides information regarding which GGSN:s 16, 17, 18, 19 that supports the APN 12, 13 in question and thus enables the SGSN 9 to switch the MT 2 to the correct GGSN 16, 17, 18, 19, from where contact is established with an IP network 20, 21. The dashed line in FIG. 2 constitutes a border line between GPRS (above) and IP networks (below).

There are three scenarios regarding how the SGSN 9 acquires an APN 12, 13:

Firstly, if the MT 2 does not provide any APN information to the SGSN 9, the SGSN 9 either chooses an NI from the subscription of the MT 2 or chooses a default NI. After that, an OI is added, making the APN 12, 13 complete.

Secondly, if the MT 2 provides an NI to the SGSN 9, the NI is verified for the user in question that has been identified previously via the IMSI. After that, if correctly verified, an OI is added thus making the APN 12, 13 complete.

Thirdly, if the MT 2 provides both an NI and an OI to the SGSN 9, the NI and OI are verified for the user in question that has been identified previously via the IMSI. If correctly verified, the APN 12, 13 is complete.

As the MT 2 is subscribed to an operator that is one of the owners of the shared network, the IMSI provides information that specifies that the MT 2 is not visiting, and if the SGSN 9 is not provided with a complete APN 12, 13, e.g. if the MT has not provided an NI, the SGSN 9 provides an NI. The SGSN 9 then has accessed information about which operator the MT 2 is subscribed to and which home network the MT 2 shall use. The SGSN 9 then uses the DNS 22 to find out which GGSN:s 16, 17, 18, 19 that may be used, and connects the MT 2 to the correct GGSN 16, 17,18, 19, establishing a so-called PDP context (Packet Data Protocol), i.e. a connection for GPRS.

If, however, an MT 4 that is subscribed to an operator that is not one of the owners of the shared network 6, the SGSN 9 contacts a HLR 23, 24 of that MT:s home network 25, 26 and uses the IMSI to find out that the MT 4 is a visiting MT. Note that the element shown in the home network 25, 26 is that which is necessary for the understanding of the invention, and a number of other, not shown, elements may be a part of the home network 25, 26. Said HLR 23, 24 confirms that the MT 4 is allowed to use the shared network, i.e. the operator that the MT 4 is subscribed to has an agreement with one or more of the owners of the shared network. Previously known technology does not disclose with which of the owners of the shared network that the MT 4 operator has an agreement, the visiting OI is not derived, why it is not possible to predict towards which GGSN 16, 17, 18, 19 the MT 4 will establish its PDP context.

According to the invention, the visiting terminal's OI is derived from the IMSI in said terminal. This makes it possible to assign the correct visiting OI for all visiting mobiles. Thus a dynamically assigned visiting OI based on the IMSI is introduced.

We will now describe an example according to the invention with continued reference to FIG. 2. Four mobile terminals MT 2, 3, 4, 5 have here contacted an SGSN 9 in a shared network owned by the two operators A and B. Two of the MT:s 2, 3 are subscribed to operator A and operator B, respectively, and are identified via their IMSI:s that provide complete APN:s 12, 13 consisting of NI+OI, i.e. Domain Name+operator A–OI and a Domain Name+operator B–OI, respectively. The HLR:s 10, 11 are contacted and inform the SGSN 9 that the subscribers may use the APN:s 12, 13 that are chosen. The SGSN 9 then uses the DNS 22 to find out which GGSN:s 16, 17, 18, 19 that may be used, and switches the MT:s 2, 3 to the correct GGSN:s, 16, 17, 18, 19, establishing PDP contexts. The MT 2 then establishes a PDP context with an appropriate GGSN 16, 17 in the home network 14 of operator A and the MT 3 then establishes a PDP context with an appropriate GGSN 18, 19 in the home network 15 of operator B. The GGSN:s 16, 17, 18, 19 then establishes contact with desired IP networks 20, 21.

The other two MT:s 4, 5 are subscribed to operator X and operator Y, respectively, and are identified via their IMSI as visiting. Assuming operator X has an agreement with operator A and operator Y has an agreement with operator B, the correct subscriber may now be connected to the correct operator, A or B. By way of example, this is achieved by means of a list in the SGSN 9 that provides a complete APN 12, 13 consisting of NI+OI, i.e. a Domain Name+operator A–OI and a Domain Name+operator B–OI, respectively. The HLR:s 23, 24 are contacted and inform the SGSN 9 that the subscribers may use the APN:s 12, 13 that are chosen. The SGSN 9 then uses the DNS 22 to find out which GGSN:s 16, 17, 18, 19 that may be used, and switches the MT:s 4, 5 to the correct GGSN 16, 17, 18, 19, establishing PDP contexts. The MT 4 then establishes a PDP context with an appropriate GGSN 16, 17, in the home network 14 of operator A and the MT 5 then establishes a PDP context with an appropriate GGSN 18, 19 in the home network 15 of operator B. The GGSN:s 16, 17, 18, 19 then establishes contact with desired IP networks 20, 21.

It is to be noted that the embodiment example described above only is an example of how the invention may be applied. The shared network may be owned by more than two operators, and the agreements with the visiting MT:s 4, 5 may be of a more detailed nature than what has been described in the example above.

The connections shown in FIG. 2 shall only be regarded as examples of possible connections, not as limitations in any way.

The invention is not limited to UMTS, but may be used for any other suitable radio system, e.g. GSM, CDMA (Code Division Multiple Access) or TDMA (Time Division Multiple Access).

The invention is not limited to what has been described above, but may be varied freely within the scope of the appended claims.

The invention claimed is:

1. Method for a shared radio network, the shared radio network being owned by two or more operators, the method comprising:

determining which one of said operators of a shared radio network that a visiting MT (Mobile Terminal), which MT is not subscribed to any of said operators of said shared radio network, is going to be connected to, deriving information from said visiting MT concerning its identity, and using said derived information in said shared radio network for determining which one of said operators said visiting MT is going to be connected to.

2. Method according to claim 1, wherein said shared radio network uses GPRS (Global Packet Radio Service).

3. Method according to claim 1, wherein said shared radio network uses the radio system UMTS (Universal Mobile Telecommunications System).

4. Method according to claim 1, wherein said shared radio network uses the radio system GSM (Global System for Mobile communication).

5. Method according to claim 1, wherein said shared radio network uses any of the radio systems CDMA (Code Division Multiple Access) or TDMA (Time Division Multiple Access).

6. Method according to claim 1, wherein the IMSI (International Mobile Subscriber Identity) of the visiting MT is used for deriving information concerning the identity of said visiting MT.

7. Method according to claim 6, wherein said shared radio network uses GPRS (Global Packet Radio Service).

8. Method according to claim 6, wherein said shared radio network uses any one of the following radio systems: UMTS (Universal Mobile Telecommunications System), GSM (Global System for Mobile communication), CDMA (Code Division Multiple Access) or TDMA (Time Division Multiple Access).

9. Method according to claim 2, wherein the method uses a list in the SGSN (Switching GPRS Support Node) of said shared radio network for comparison with the derived information concerning the identity of the visiting MT.

10. Method according to claim 9, wherein said shared radio network uses any one of the following radio systems: UMTS (Universal Mobile Telecommunications System), GSM (Global System for Mobile communication), CDMA (Code Division Multiple Access) or TDMA (Time Division Multiple Access).

11. Device for use in a shared radio network, the shared radio network being owned by two or more operators, the device comprising electronic circuitry configured to:

determine which one of said operators of a shared radio network that a visiting MT (Mobile Terminal), which MT is not subscribed to any of said operators of said shared radio network, is going to be connected to, by deriving information from said visiting MT concerning its identity, and determining which one of said owners said visiting MT is going to be connected to, based on said derived information.

12. Device according to claim 11, wherein said shared radio network is adapted for GPRS (Global Packet Radio Service).

13. Device according to claim 12, wherein said device comprises means for comparing the derived information concerning the identity of the visiting MT with a list in the SGSN (Switching GPRS Support Node) of said shared radio network.

14. Device according to claim 13, wherein said shared radio network is adapted for any one of the following radio systems: UMTS (Universal Mobile Telecommunications System), GSM (Global System for Mobile communication), CDMA (Code Division Multiple Access) or TDMA (Time Division Multiple Access).

15. Device according to claim 11, wherein said shared radio network is adapted for the radio system UMTS (Universal Mobile Telecommunications System).

16. Device according to claim 11, wherein said shared radio network is adapted for the radio system GSM (Global System for Mobile communication).

17. Device according to claim 11, wherein said shared radio network is adapted for any of the radio systems CDMA (Code Division Multiple Access) or TDMA (Time Division Multiple Access).

18. Device according to claim 11, wherein said device comprises means for deriving information concerning the identity of the visiting MT from the IMSI (International Mobile Subscriber Identity) of said visiting MT.

19. Device according to claim 18, wherein said shared radio network is adapted for GPRS (Global Packet Radio Service).

20. Device according to claim 18, wherein said shared radio network is adapted for any one of the following radio systems: UMTS (Universal Mobile Telecommunications System), GSM (Global System for Mobile communication), CDMA (Code Division Multiple Access) or TDMA (Time Division Multiple Access).

* * * * *